(12) United States Patent
Parks, Jr.

(10) Patent No.: US 11,543,035 B2
(45) Date of Patent: Jan. 3, 2023

(54) GATE VALVE GATE MEMBER FOR A GATE VALVE

(71) Applicant: CACTUS WELLHEAD, LLC, Houston, TX (US)

(72) Inventor: Glenn C. Parks, Jr., Cypress, TX (US)

(73) Assignee: CACTUS WELLHEAD, LLC, Houston, TX (US)

( * ) Notice: Subject to any disclaimer, the term of this patent is extended or adjusted under 35 U.S.C. 154(b) by 0 days.

(21) Appl. No.: 17/461,402

(22) Filed: Aug. 30, 2021

(65) Prior Publication Data

US 2021/0388906 A1    Dec. 16, 2021

Related U.S. Application Data

(63) Continuation of application No. 16/271,576, filed on Feb. 8, 2019, now Pat. No. 11,125,340.

(60) Provisional application No. 62/746,430, filed on Oct. 16, 2018.

(51) Int. Cl.
   *F16K 3/02* (2006.01)

(52) U.S. Cl.
   CPC .............. *F16K 3/02* (2013.01); *F16K 3/0209* (2013.01)

(58) Field of Classification Search
   CPC ........... F16K 3/02; F16K 3/0209; F16K 3/314
   USPC ................................................ 251/326–329
   See application file for complete search history.

(56) References Cited

U.S. PATENT DOCUMENTS

| | | | |
|---|---|---|---|
| 7,017,886 B1 * | 3/2006 | Ngene-Igwe | F16K 3/0227 251/326 |
| 9,841,110 B2 * | 12/2017 | Fletcher | F02M 35/10255 |

* cited by examiner

*Primary Examiner* — John Bastianelli
(74) *Attorney, Agent, or Firm* — Ewing & Jones, PLLC

(57) ABSTRACT

A gate valve and gate member for a gate valve, which may be used for hydrocarbon well fracturing operations with a fracturing fluid, or "frac fluid", includes a seat, having a seat end face which is in sliding contact with a gate member that has a sealing face surface with at least one recess formed in the sealing face surface of the gate member.

15 Claims, 5 Drawing Sheets

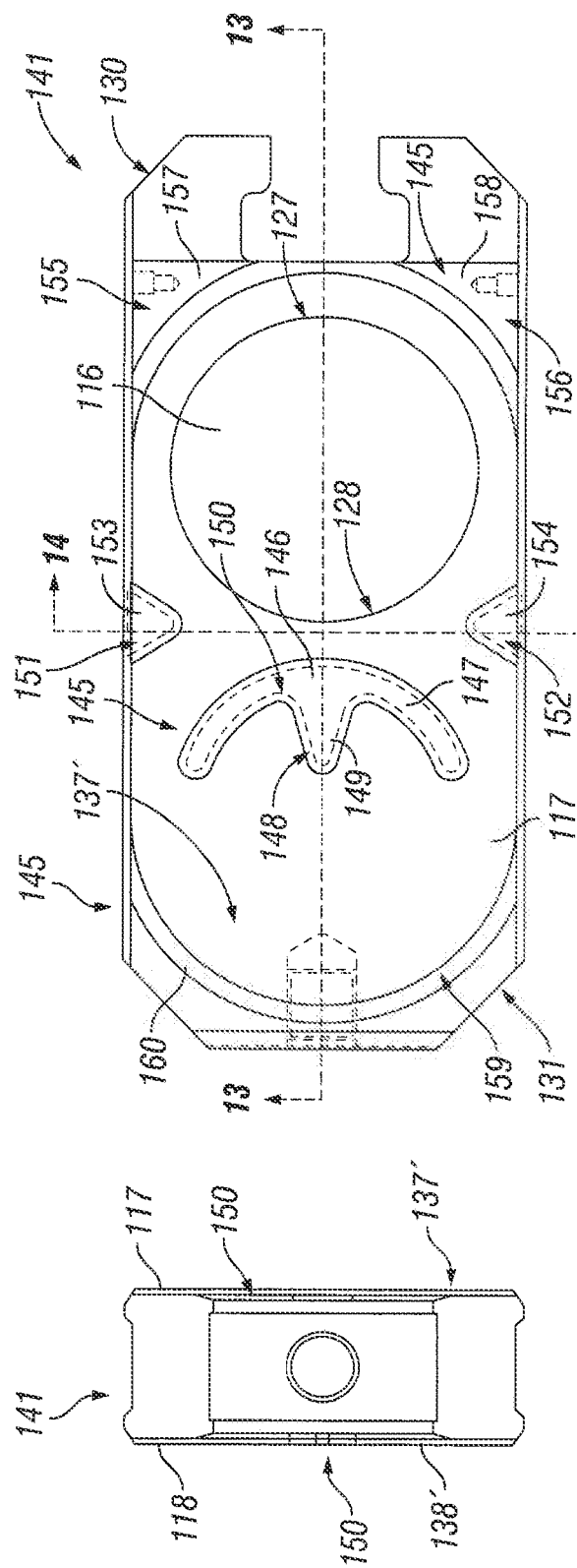

US 11,543,035 B2

GATE VALVE GATE MEMBER FOR A GATE VALVE

RELATED APPLICATIONS

This application is a continuation of and claims the benefit, and priority benefit, of U.S. patent application Ser. No. 16/271,576, filed Feb. 8, 2019, and U.S. Provisional Patent Application Ser. No. 62/746,430, filed Oct. 16, 2018, the disclosures and contents of which are incorporated by reference herein in its entirety.

BACKGROUND OF THE INVENTION

Field of the Disclosure

This disclosure relates generally to the field of gate valves, and in particular to gate valves for use in fracturing operations conducted in connection with wells for the production of hydrocarbons.

Description of the Related Art

In oilfield production operations, some wells may be stimulated to increase the production of hydrocarbons, such as oil and gas. Such techniques may include high-pressure, or hydraulic, fracturing of the well formation, known to the art as "fracing" a well formation. Generally, in this process a sand-bearing slurry or fracturing fluid, or "frac fluid", is pumped down into the formation surrounding the wellbore at very high pressure. The sand particles of the frac fluid become embedded in small cracks and fissures in the formation, wedging them open and, thus, increasing the flow of produced fluid. Typically, the fluids used during fracturing are often very abrasive. Gate valves may be used in connection with the wellhead during fracturing operations, through which pass the sand-bearing slurry, or frac fluid, as well as other debris generated in connection with the fracturing operations. The frac fluid may damage components of the gate valves.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one illustrative embodiment, a gate valve for a fluid may include: a valve body having an internal valve cavity; first and second flow passageways extending through the valve body, each passageway having a longitudinal axis; a gate member, having an upper end, a lower end, a first side and a second side, disposed within the valve body, the gate member having an opening, the opening having an upper end and a lower end, and the gate member is moveable into a fluid transmitting relationship with the first and second flow passageways; a first seat between the gate member and the first flow passageway, the first seat having first and second ends, the first end disposed adjacent the first flow passageway and the second end disposed adjacent the first side of the gate member, the second end of the first seat having a seat end face; the gate member having a first sealing face surface on the first side of the gate member; and the first sealing face surface of the gate member having at least one recess formed in the first sealing face surface, which recess is disposed in a spaced relationship from a portion of the seat end face of the second end of the first seat as the gate member moves into the fluid transmitting relationship with the first and second flow passageways. The at least one recess may include an arc-shaped portion.

In another illustrative embodiment, a gate member for a gate valve for a fluid, the gate valve including a valve body having an internal valve cavity, first and second flow passageways extending through the valve body, each passageway having a longitudinal axis, a first seat having first and second ends, the first end disposed adjacent the first flow passageway, the second end of the first seat having a seat end face, may include: a gate member, having an upper end, a lower end, a first side and a second side and having an opening, the opening having an upper end and a lower end, and the gate member is moveable into a fluid transmitting relationship with the first and second flow passageways; the gate member having a first sealing face surface on the first side of the gate member; and the first sealing face surface of the gate member having at least one recess formed in the first sealing face surface, which recess is disposed in a spaced relationship from a portion of the seat end face of the second end of the first seat as the gate member moves into the fluid transmitting relationship with the first and second flow passageways. The at least one recess may include an arc-shaped portion.

BRIEF DESCRIPTION OF THE DRAWING

The present gate valve and gate member for a gate valve may be understood by reference to the following description taken in conjunction with the accompanying drawing, in which:

FIG. 10 is a top view of a gate member in accordance with an illustrative embodiment of the present invention;

FIG. 11 is a side view of the gate member of FIG. 10;

FIG. 12 is an end view of the gate member of FIG. 10;

Figure 3:
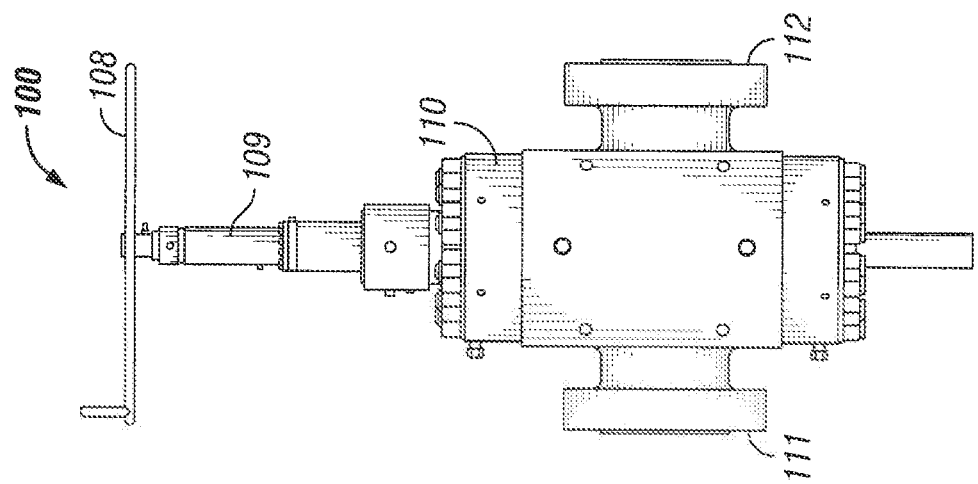
FIG. 3 is front view of the gate valve of FIG. 1.
Figure 2:
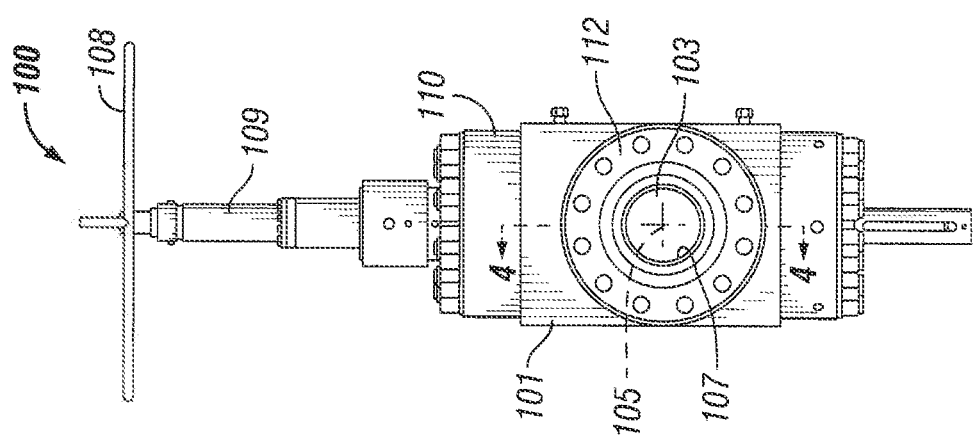
FIG. 2 is a side view of the gate valve of FIG. 1.
Figure 1:
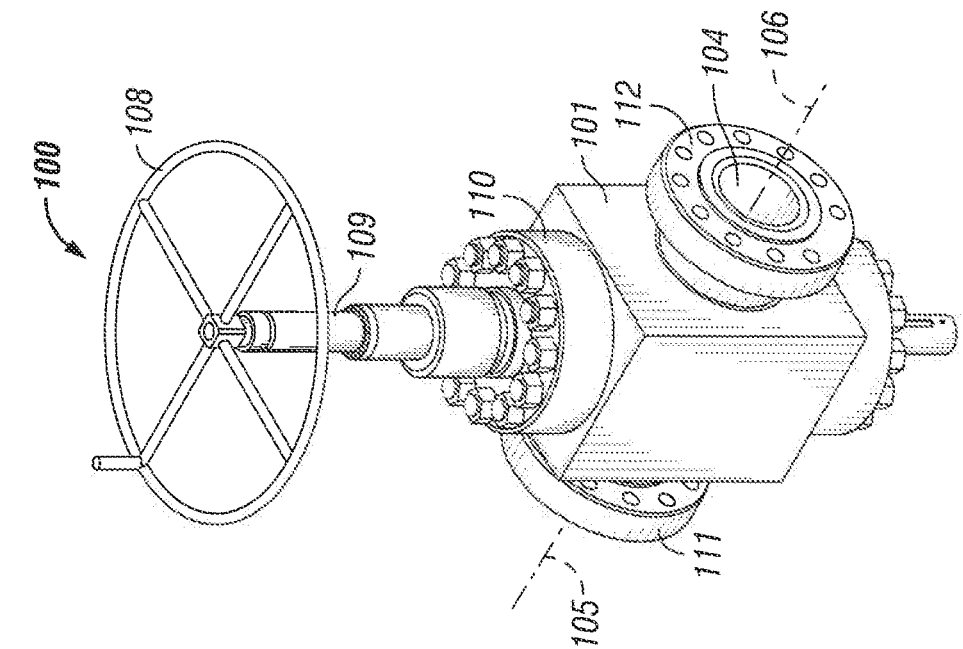
FIG. 1 is a perspective view of a conventional gate valve in accordance with an illustrative embodiment of the invention.

While certain embodiments of the present gate valve and gate member for a gate valve will be described in connection with the present illustrative embodiments shown herein, it will be understood that it is not intended to limit the invention to those embodiments. On the contrary, it is intended to cover all alternatives, modifications, and equivalents, as may be included within the spirit and scope of the invention as defined by the appended claims and claims to be filed in a subsequent non-provisional patent application. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION OF THE SPECIFIC EMBODIMENTS

It should be understood that, although an illustrative implementation of one or more embodiments are provided below, the various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. Furthermore, the disclosure may be modified within the scope of the appended claims along with their full scope of equivalents.

Figure 4:
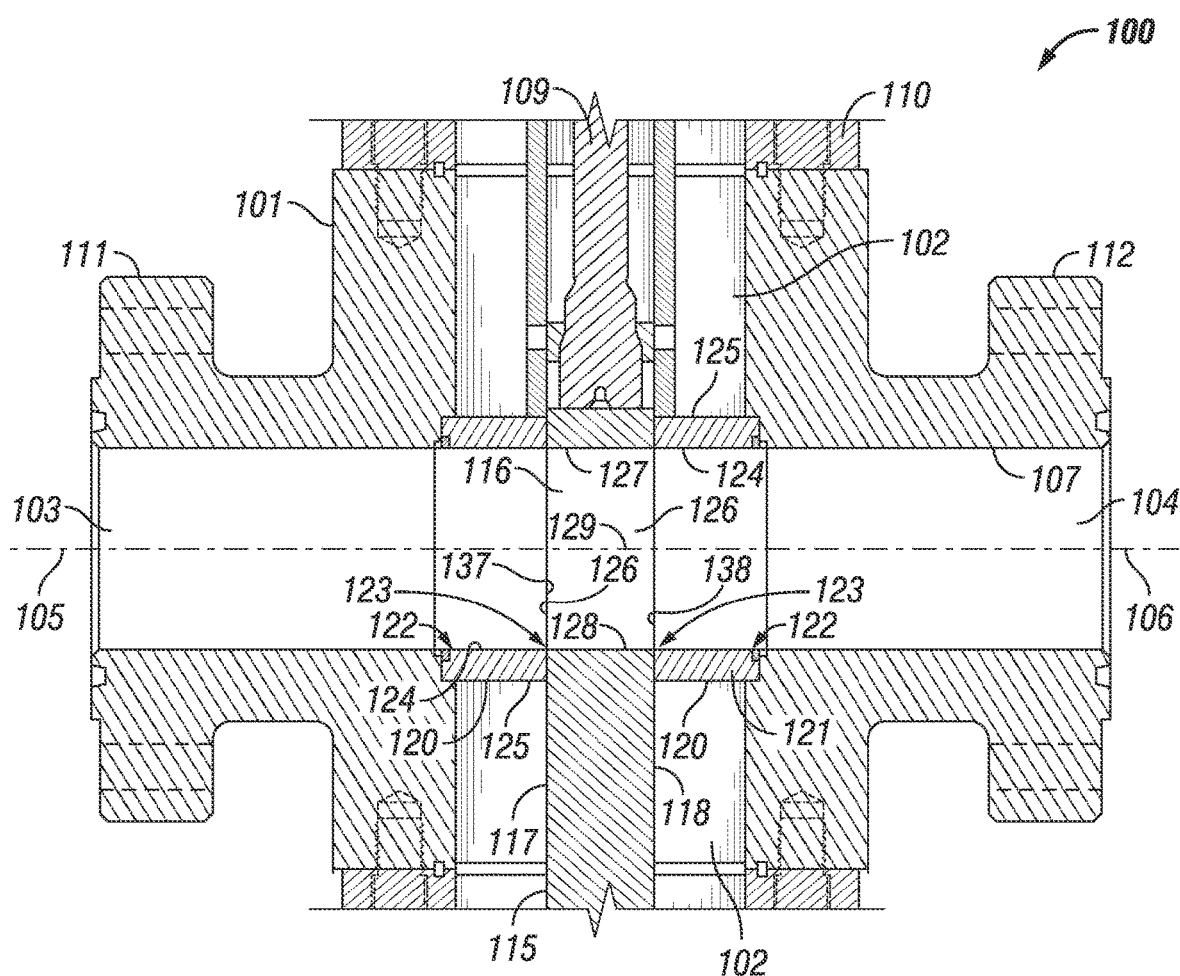
FIG. 4 is a partial cross-sectional view taken along lines 4-4 of FIG. 2.

With reference to FIGS. 1-4, a gate valve 100 in accordance with an illustrative embodiment is shown to generally include a valve body 101 having an internal valve cavity 102, first and second passageways 103, 104 extending through the valve body 101, with each passageway 103, 104 having a longitudinal axis 105, 106. Preferably, as shown in FIG. 4, the longitudinal axes 105, 106 are coplanar and coincide with each other. As known in the art, gate valve 100 may be provided with a hand wheel 108, or another conventional actuation device, to move a valve stem 109 upwardly or downwardly within valve cavity 102. Gate valve 100 also preferably includes a conventional bonnet 110 that seals about valve stem 109 and seals off valve cavity 102 at the top of valve body 101. Valve body 101 may include conventional flanged connectors 111, 112, and sections of pipe (not shown) may be connected to the flanged connectors 111, 112 in a conventional manner. A fluid, such as a sand-bearing slurry or fracturing fluid or "frac fluid", or any other conventional fluid, may be pumped through the gate valve 100 to flow through the valve body 101 and through the first and second passageways, or flow passageways, 103, 104.

Figure 5:
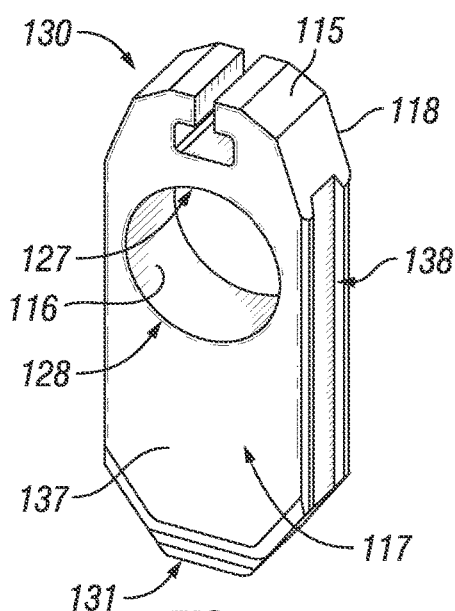
FIG. 5 is a perspective view of the gate member of the gate valve of FIG. 4.

With reference to FIGS. 4-5, a gate member 115, associated with valve stem 109, is disposed within the valve body 101, and is movable within valve body 101 by movement of valve stem 109 caused by rotating hand wheel 108, or by another actuation device. Gate member 115 has an upper end 130 and a lower end 131, and a first side 117 facing in the direction toward the first flow passageway 103, and a second side 118 facing in the direction toward the second flow passageway 104. Gate member 115 has a circular shaped opening 116 having an upper end 127 and a lower end 128, and upon movement of valve stem 109, the opening 116 of gate member 115 may be moved into, and out of, a fluid transmitting relationship with the first and second flow passageways 103, 104, in a conventional manner. Gate valve 100 is shown in its fully open, fluid transmitting relationship, with opening 116 in alignment with the first and second passageways 103, 104. A seat, or valve seat, 120 is disposed within valve cavity 102 between gate member 115 and each of the passageways 103, 104, whereby when gate member is in its open position, as shown in FIG. 4, fluid may flow through the seats 120, the opening 116 in gate member 115, and through the first and second passageways 103, 104. Gate valve 100 is illustrated as a bi-directional gate valve, in which fluid may flow through gate valve 100 either in a direction from left to right, or right to left as viewed in connection with FIG. 4. If gate valve 100 is used as a bi-directional gate valve, the seats 120 would preferably be of the same construction, and both sides 117, 118 of the gate member 115 would have the same structure, including a flat, sealing face surface, or bearing surface, 137, 138. As shown in FIG. 4, the seats 120 are of the same construction and design.

Figure 6:
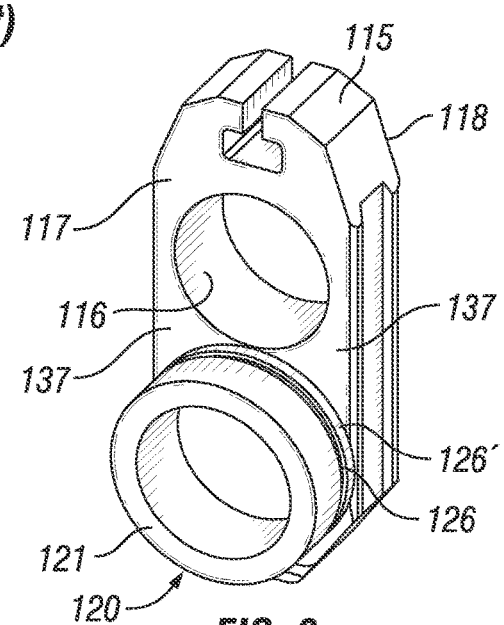
FIG. 6 is a perspective view of the gate member of FIG. 5 illustrating a valve seat contacting the gate member.

As shown in FIGS. 4 and 6, seats, or valve seats, 120 are preferably a tubular member 121 having a longitudinal axis 129, first and second ends 122, 123, and an inner wall surface 124 and an outer wall surface 125 extending between the first and second ends 122, 123. The first ends 122 of elongate tubular members 121 are disposed adjacent the first or second flow passageways 103, 104 and the second ends 123 are disposed adjacent the gate member 115. The second ends 123 of each tubular member 121 each have a seat end face 126 which is in a sliding and sealing engagement with the sealing face surfaces 137, 138 of gate member 115 as gate member 115 moves downwardly between its fully closed position of FIG. 6 to its fully open position of FIG. 4. In FIG. 6, a seat 120 with its seat end face 126 is shown in a sliding and sealing engagement with the sealing face surface 137 on the first side 117 of gate member 115. Similarly, the other seat 120 would be in a sliding and sealing engagement with the sealing face surface 138 of the second side 118 of gate member 115.

Figure 7:
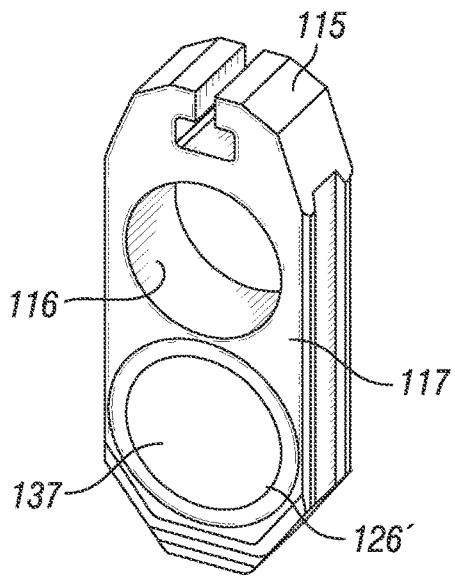
FIG. 7 is a perspective view of the gate member of FIG. 5 with a thin section of the valve seat, that is shown as being transparent, contacting the gate member when the gate member is in its fully closed position in the gate valve.

With reference to FIG. 7, a thin section, or slice, 126' of the seat end face 126 of valve seat 120 is shown contacting the sealing face surface 137 on the first side 117 of gate member 115 when the gate member 115 is in its fully closed position in the gate valve 100. For drawing clarity, the thin section 126' of the seat end face 126 is shown as being transparent.

Figure 8:
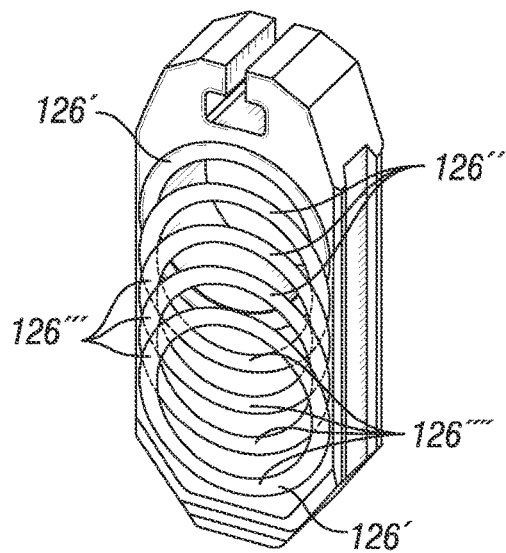
FIG. 8 is a perspective view of the gate member of FIG. 5 showing incremental movement of the thin section of the valve seat of FIG. 7 along the gate member, when the gate member is moving from the fully closed position of FIG. 6 to the fully open position shown in the gate valve of FIG. 4.

FIG. 8 illustrates incremental movement of the thin section 126' of the seat end face 126 when the gate member 115 is moving downwardly from its fully closed position of FIG. 6 to its fully open position shown in FIG. 4. As the gate member 115 moves downwardly within the gate valve 100 of FIG. 4, with respect to the seat 120, and its seat end face 126, fixed within valve body 101, seat end face 126 of seat 120, is represented by the transparent thin sections, or end sections, or slices, 126' of the seat end face 126. As the gate member 115 moves downwardly, arced portions 126" of the seat end face 126 are exposed to the fluid flow through the opening 116 in gate member 115, whereas the areas of the seat end face 126, or end sections 126''', in contact with the sealing face surface 137 adjacent opening 116 are not exposed to fluid flow through the opening 116. Additionally, the lower arced portions 126'''' of seat end face 126 in contact with the sealing face surface 137 below opening 116 are also not exposed to any fluid flow through the opening 116 in gate member 115. By use of the terms "arced" or "arc-shaped," is meant that something is arched or curved, or is any unbroken part of the circumference of a circle or other curved line.

Figure 9:
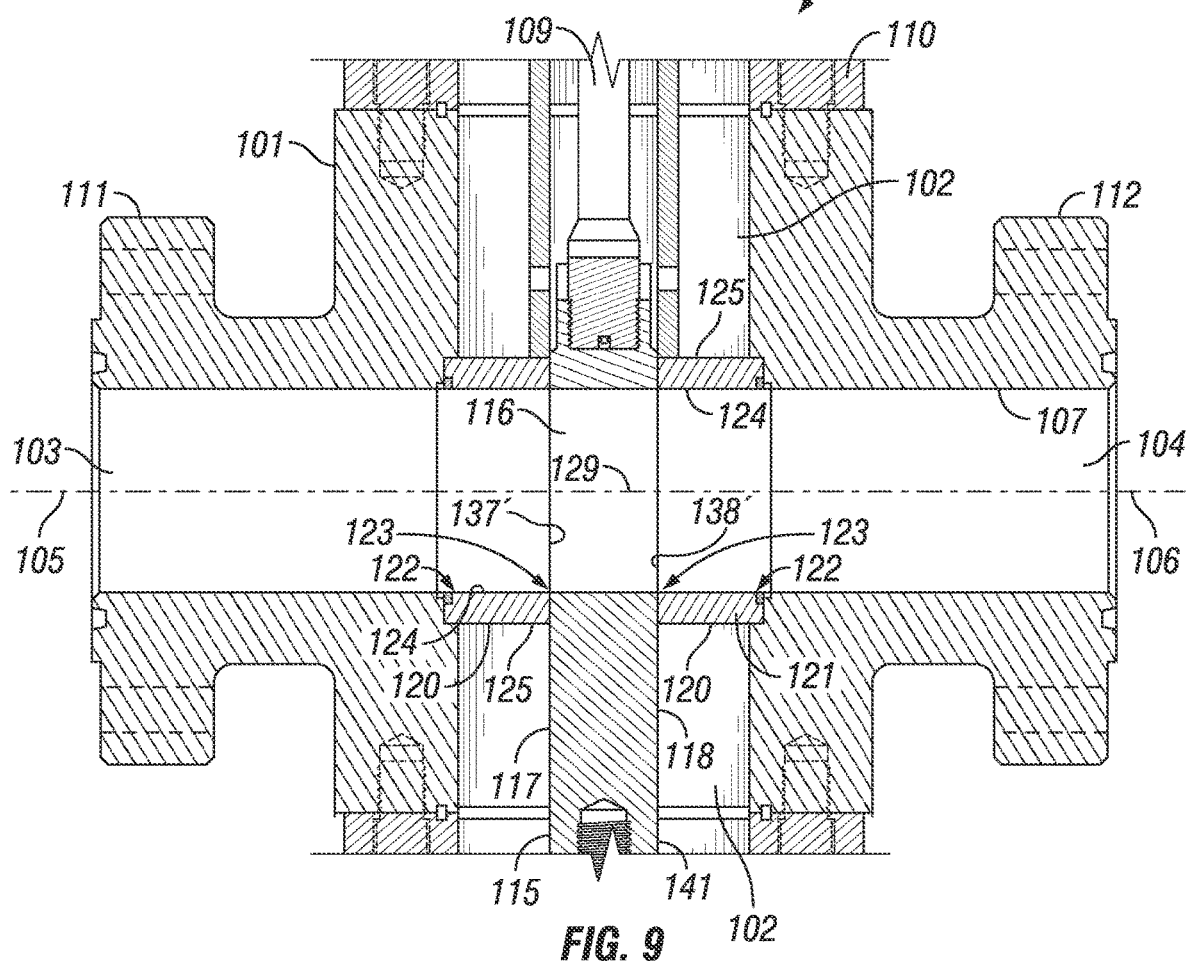
FIG. 9 is a partial cross-sectional view of a gate valve in accordance with an illustrative embodiment of the present invention.
Figure 13:
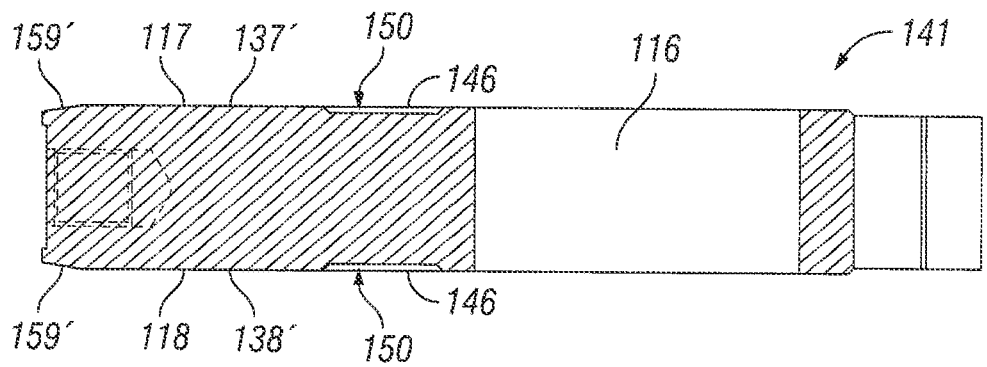
FIG. 13 is a partial cross-sectional view of the gate member of FIG. 10, taken along line 13-13 of FIG. 10.
Figure 14:
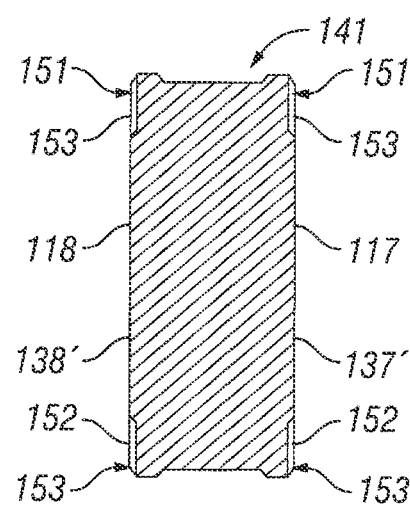
FIG. 14 is a partial cross-sectional view of the gate member of FIG. 10, taken along line 14-14 of FIG. 10.
Figure 15:
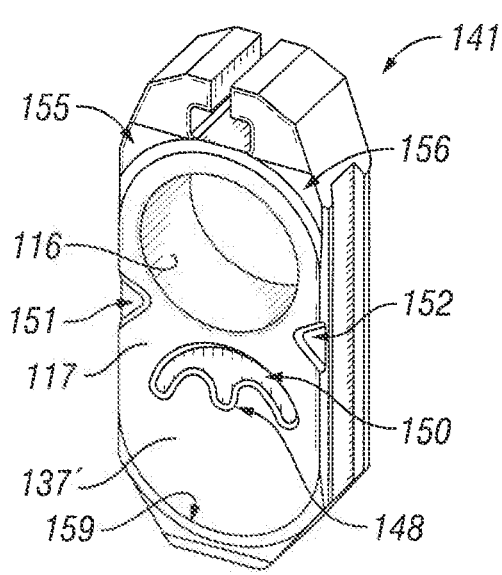
FIG. 15 is a perspective view of the gate member of FIGS. 10-12.

With reference to FIGS. 9-14, a gate valve 140 in accordance with an illustrative embodiment is shown, which includes an illustrative embodiment of the present gate member 141. Gate valve 140 shown in FIG. 9 is of the same general construction as the gate valve 100 previously described in connection with FIGS. 1-8, with the exception that the gate valve 140 is provided with the gate member 141 as hereinafter described. Components of gate valve 140 and gate member 141 that have the same structure and function of the components of the gate valve 100 and gate member 115 bear the same reference numerals. Primed reference numerals are used for components having a similar structure and function. Similar to the gate member 115 previously described, gate member 141 has an upper end 130 and a lower end 131, a first side 117 and a second side 118, and gate member 141 is disposed in the valve body 101. Gate member 141 also includes an opening 116, the opening 116 having an upper end 127 and a lower end 128, and the gate member 141 is moveable into a fluid transmitting relationship with the first and second flow passageways 103, 104. Gate member 141 has a first sealing face surface 137' on the first side 117 of the gate member 141, and a second sealing face surface 138' on the second side 118 of the gate member 141, similar to the sealing face surfaces 137, 138 of the gate member 115 previously described. Gate valve 140 includes first and second valve seats 120 as previously described in connection with gate valve 100.

The first sealing face surface 137' of gate member 141 has at least one recess 145 formed in the first sealing face surface 137' of gate member 141. Preferably, the second sealing face surface 138' of the gate member 141 also has at least one recess 145 formed in the second sealing face surface 138. As will be hereinafter described, as the gate member 141 moves into the fluid transmitting relationship with the first and second flow passageways 103, 104, the at least one recess 145 will be disposed in a spaced relationship from a portion of the seat end face 126, whereby a space 165 (FIG. 16) is provided between the seat end face 126 and the bottom 145' of the at least one recess 145 in the sealing face surface 137'. Preferably the at least one recess 145, or relief area or depression 146, is disposed in both of the sealing face surfaces 137', 138' of the first and second sides 117, 118, of the gate member 141.

With reference to FIGS. 10-15, the at least one recess 145 preferably includes an arc-shaped portion 150. By use of the terms "arced" or "arc-shaped," is meant that something is arched or curved, or is any unbroken part of the circumference of a circle or other curved line. The arc-shaped portion 150 of the at least one recess 145 provides a arc-shaped relief area or depression 147 in the first and second sealing face surfaces 137', 138'. The arc-shaped portion 150 may also include a rounded-triangular-shaped portion 148 depending from the arc-shaped portion 150. The rounded, triangular-shaped portion 148 provides a rounded, triangular-shaped relief area or depression 149 in the first and second sealing face surfaces 137', 138'. The at least one recess 145 may also include first and second rounded, triangular-shaped portions 151, 152, formed or disposed in a spaced relationship from each other and adjacent the lower end 128 of the opening 116 in the gate member 141. The first and second rounded, triangular-shaped portions of the at least one recess 145 provide rounded, triangular-shaped depressions or relief areas 153, 154 in the sealing face surfaces 137', 138' of the gate member 141. The at least one recess 145 formed in the sealing face surfaces 137' and 138' may also include first and second triangular-shaped portions 155, 156 disposed in a spaced relationship from each other and adjacent the upper end 127 of the opening 116 in gate member 141. These first and second triangular-shaped portions 155, 156, provide first and second triangular-shaped depressions or relief areas 157, 158, in the first and second sealing face surfaces 137', 138'. The at least one recess 145 formed in the first and second sealing face surfaces 137', 138' may also include an arc-shaped portion, or recess, 159 disposed adjacent the lower end 131 of the gate member 141. The arc-shaped portion 159 provides an arc-shaped relief area or depression 160 formed in the first and second sealing face surfaces 137', 138' of the gate member 141.

Figure 16:
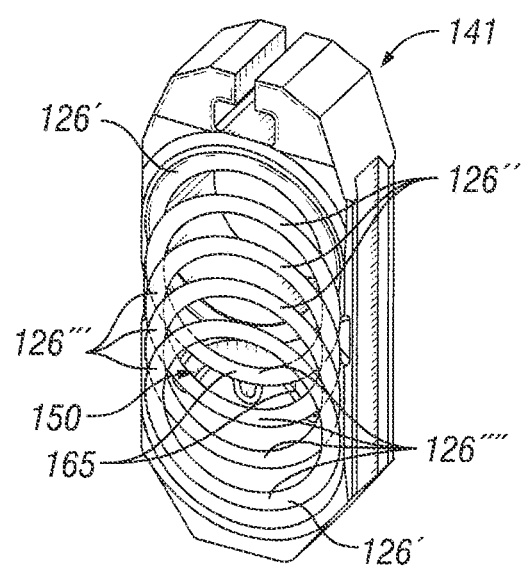
FIG. 16 is a perspective view of the gate member of FIGS. 10-12, similar to FIG. 8, showing incremental movement of a thin transparent section of a valve seat along the gate member of FIG. 10, when the gate member is moving from a fully-closed position to a fully open position within a gate valve.

With reference to FIG. 16, incremental movement of a thin section 126' of the seat end face 126 is shown when the gate member 141 is moving downwardly from its fully closed position, similar to the closed position illustrated in FIG. 6, to its fully open position shown in FIG. 9. As the gate member 141 moves downwardly within the gate valve 140 of FIG. 9, with respect to the seat 120 and its seat end face 126, fixed within valve body 101, seat end face 126 of seat 120, is represented by the transparent thin sections, or end sections, or slices, 126' of the seat end face 126. As the gate member 141 moves downwardly, arced portions 126" of the seat end face 126 are exposed to the fluid flow through the opening 116 in gate member 141. The at least one recess 145 in the sealing face surface 137' of gate member 141, which may include the arc-shaped portion 150, the rounded, triangular-shaped portion 148, the first and second rounded, triangular-shaped portions 151, 152, the first and second triangular-shaped portions 155, 156, and the arc-shaped portion 159 allows for all the other areas of the seat end face 126, or end sections 126''' and the lower arc portions 126'''' of seat end face 126 in contact with the sealing face surface 137' to also be exposed to fluid flow through the opening 116 in gate member 141. Thus, the entire surface of the seat end face 126 may be exposed to the fluid flow through the opening 161 at some point during the stroking of the gate member 141, when gate member 141 moves downwardly within the gate valve 140. The various depressions, or relief areas, 147, 149, 153, 154, 157, 158, and 160 hold some of the fluid flow flowing through the opening 116 of the gate member 141, and that fluid held within those relief areas washes off any foreign material that may be trapped between the seat end face 126 of seat 120, and the gate member 141. By removing such foreign material from the seat end face 126, it is believed that the lifespan of both the seats 120 and the gate member 141 will be increased by reducing potential damage to the seat end faces 126 and the sealing face surfaces 137' and 138' of the gate member 141.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. When numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above, but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it may be understood that the disclosed embodiments might be embodied in many other specific forms without departing from the spirit or scope of the present disclosure and the appended claims. The present examples are to be considered as illustrative and not restrictive, and the intention is not to be limited to the details given herein. For example, the various elements or components may be combined or integrated in another system or certain features may be omitted, or not implemented.

In addition, the various embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

I claim:

1. A gate member for a gate valve for a fluid, the gate valve including a valve body having an internal valve cavity, first and second flow passageways extending through the valve body, each passageway having a longitudinal axis, a first seat having first and second ends, the first end disposed adjacent the first flow passageway, the second end of the first seat having a seat end face, the first seat being tubular, the gate member comprising:
   a gate member, having an upper end, a lower end, a first side and a second side, and having an opening, the opening having an upper end and a lower end, and the gate member is moveable between an open position in which the opening is positioned into a fluid transmitting relationship with the first and second flow passageways and a closed position in which the opening is out of alignment with the first and second flow passageways;
   the gate member having a first sealing face surface on the first side of the gate member, the interface between the seat end face and the gate member being annular and having an outer diameter; and
   the first sealing face surface of the gate member having at least one recess formed in the first sealing face surface, the recess disposed in a spaced relationship from a portion of the seat end face of the second end of the first seat as the gate member moves into the fluid transmitting relationship with the first and second flow passageways, the at least one recess being discontiguous with the opening of the gate member, wherein:
   the recess is positioned entirely within the outer diameter of the annular interface between the seat end face and the gate member when the gate member is in the closed position, such that the at least one recess is in fluid communication with the first flow passageway and not the internal valve cavity when the gate is in the closed position.

2. The gate member of claim 1, including a second seat having first and second ends, the first end disposed adjacent the second flow passageway, the second end of the second seat having a seat end face; the gate member having a second sealing face surface on the second side of the gate member; the second sealing face surface of the gate member having at least one recess formed in the second sealing face surface, the recess disposed in a spaced relationship from a portion of the seat end face of the second end of the second seat as the gate member moves into the fluid transmitting relationship with the first and second flow passageways.

3. The gate member of claim 2, wherein the at least one recess formed in the first sealing face surface includes an arc-shaped portion.

4. The gate member of claim 3, wherein the arc-shaped portion of the at least one recess includes a rounded, triangular-shaped portion depending from the arc-shaped portion.

5. A gate member for a gate valve for a fluid, the gate valve including a valve body having an internal valve cavity, first and second flow passageways extending through the valve body, each passageway having a longitudinal axis, a first seat having first and second ends, the first end disposed adjacent the first flow passageway, the second end of the first seat having a seat end face, the first seat being tubular, the gate member comprising:
   a gate member, having an upper end, a lower end, a first side and a second side, and having an opening, the opening having an upper end and a lower end, and the gate member is moveable between an open position in which the opening is positioned into a fluid transmitting relationship with the first and second flow passageways and a closed position in which the opening is out of alignment with the first and second flow passageways;
   the gate member having a first sealing face surface on the first side of the gate member, the interface between the seat end face and the gate member being annular and having an outer diameter; and
   the first sealing face surface of the gate member having at least one recess formed in the first sealing face surface, the recess disposed in a spaced relationship from a portion of the seat end face of the second end of the first seat as the gate member moves into the fluid transmitting relationship with the first and second flow passageways, the at least one recess being discontiguous with the opening of the gate member, wherein:
   the recess is positioned entirely outside the outer diameter of the annular interface between the seat end face and the gate member when the gate member is in the closed position, such that the at least one recess is in fluid communication with the internal valve cavity and not the first flow passageway when the gate is in the closed position.

6. The gate member of claim 5, wherein the first sealing face surface includes first and second rounded triangular-shaped portions, disposed in a spaced relationship from each other and aligned with the lower end of the opening in the gate member.

7. The gate member of claim 5, wherein the first sealing face surface includes first and second triangular-shaped portions disposed in a spaced relationship from each other and adjacent aligned with the upper end of the opening in the gate member.

8. The gate member of claim 5, wherein the first sealing face surface includes an arc-shaped portion disposed adjacent the lower end of the gate member.

9. A gate valve for a fluid comprising:
a valve body having an internal valve cavity;
first and second flow passageways extending through the valve body, each passageway having a longitudinal axis;
a gate member, having an upper end, a lower end, a first side and a second side, disposed within the valve body, the gate member having an opening, the opening having an upper end and a lower end, and the gate member is moveable between an open position in which the opening is positioned into a fluid transmitting relationship with the first and second flow passageways and a closed position in which the opening is out of alignment with the first and second flow passageways;
a first seat between the gate member and the first flow passageway, the first seat having first and second ends, the first end disposed adjacent the first flow passageway and the second end disposed adjacent the first side of the gate member, the second end of the first seat having a seat end face, the first seat being tubular, the interface between the seat end face and the gate member being annular and having an outer diameter;
the gate member having a first sealing face surface on the first side of the gate member; and
the first sealing face surface of the gate member having at least one recess formed in the first sealing face surface, the recess disposed in a spaced relationship from a portion of the seat end face of the second end of the first seat as the gate member moves into the fluid transmitting relationship with the first and second flow passageways, the at least one recess being discontiguous with the opening of the gate member, wherein:
the recess is positioned entirely within the outer diameter of the annular interface between the seat end face and the gate member when the gate member is in the closed position, such that the at least one recess is in fluid communication with the first flow passageway and not the internal valve cavity when the gate is in the closed position.

10. The gate valve of claim 9, including a second seat between the gate member and the second flow passageway, the second seat having first and second ends, the first end disposed adjacent the second flow passageway and the second end of the second seat disposed adjacent the second side of the gate member, the second end of the second seat having a seat end face; the gate member having a second sealing face surface on the second side of the gate member; the second sealing face surface of the gate member having at least one recess formed in the second sealing face surface, the recess disposed in a spaced relationship from a portion of the seat end face of the second end of the second seat as the gate member moves into the fluid transmitting relationship with the first and second flow passageways.

11. The gate valve of claim 10, wherein the at least one recess formed in the first sealing face surface includes an arc-shaped portion.

12. A gate valve for a fluid comprising:
a valve body having an internal valve cavity;
first and second flow passageways extending through the valve body, each passageway having a longitudinal axis;
a gate member, having an upper end, a lower end, a first side and a second side, disposed within the valve body, the gate member having an opening, the opening having an upper end and a lower end, and the gate member is moveable between an open position in which the opening is positioned into a fluid transmitting relationship with the first and second flow passageways and a closed position in which the opening is out of alignment with the first and second flow passageways;
a first seat between the gate member and the first flow passageway, the first seat having first and second ends, the first end disposed adjacent the first flow passageway and the second end disposed adjacent the first side of the gate member, the second end of the first seat having a seat end face, the first seat being tubular, the interface between the seat end face and the gate member being annular and having an outer diameter;
the gate member having a first sealing face surface on the first side of the gate member; and
the first sealing face surface of the gate member having at least one recess formed in the first sealing face surface, the recess disposed in a spaced relationship from a portion of the seat end face of the second end of the first seat as the gate member moves into the fluid transmitting relationship with the first and second flow passageways, the at least one recess being discontiguous with the opening of the gate member, wherein:
the recess is positioned entirely outside the outer diameter of the annular interface between the seat end face and the gate member when the gate member is in the closed position, such that the at least one recess is in fluid communication with the internal valve cavity and not the first flow passageway when the gate is in the closed position.

13. The gate valve of claim 12, wherein the first sealing face surface includes first and second rounded triangular-shaped portions, disposed in a spaced relationship from each other and aligned with the lower end of the opening in the gate member.

14. The gate valve of claim 12, wherein the first sealing face surface includes first and second triangular-shaped portions disposed in a spaced relationship from each other and aligned with the upper end of the opening in the gate member.

15. The gate valve of claim 12, wherein the first sealing face surface includes an arc-shaped portion disposed adjacent the lower end of the gate member.

* * * * *